United States Patent
Yonemoto et al.

(10) Patent No.: US 11,367,873 B2
(45) Date of Patent: Jun. 21, 2022

(54) CATHODE ACTIVE MATERIAL AND LITHIUM-ION ELECTROCHEMICAL SYSTEM THEREOF

(71) Applicant: Microvast Power Systems Co., Ltd., Zhejiang (CN)

(72) Inventors: Bryan Yonemoto, Clearwater, FL (US); Karima Lasri, Orlando, FL (US); Xiao Zhang, Zhejiang (CN)

(73) Assignee: Microvast Power Systems Co., Ltd., Zhejiang (CN)

(*) Notice: Subject to any disclaimer, the term of this patent is extended or adjusted under 35 U.S.C. 154(b) by 316 days.

(21) Appl. No.: 16/581,802

(22) Filed: Sep. 25, 2019

(65) Prior Publication Data

US 2020/0119349 A1  Apr. 16, 2020

Related U.S. Application Data (60) Provisional application No. 62/735,955, filed on Sep. 25, 2018.

(51) Int. Cl.
*H01M 4/525* (2010.01)
*H01M 4/505* (2010.01)

(52) U.S. Cl.
CPC .......... *H01M 4/525* (2013.01); *H01M 4/505* (2013.01)

(58) Field of Classification Search
CPC ...... H01M 4/525; H01M 4/505; H01M 4/485; H01M 10/0525; H01M 2004/028; Y02E 60/10
See application file for complete search history.

(56) References Cited

U.S. PATENT DOCUMENTS

| | | | |
|---|---|---|---|
| 5,240,794 A | 8/1993 | Thackeray et al. |
| 5,264,201 A | 11/1993 | Dahn et al. |
| 6,391,493 B1 | 5/2002 | Goodenough et al. |
| 6,420,069 B2 | 7/2002 | Amine et al. |
| 6,660,432 B2 | 12/2003 | Paulsen et al. |
| 6,677,082 B2 | 1/2004 | Thackeray et al. |
| 6,855,461 B2 | 2/2005 | Lampe-Onnerud et al. |
| 7,303,840 B2 | 12/2007 | Thackeray et al. |
| 8,080,340 B2 | 12/2011 | Thackeray |

OTHER PUBLICATIONS

Arai, Thermal reactions between delithiated lithium nickelate and electrolyte solutions, Journal of the Electrochemical Society, 149 (4) A401-A406 (2002).*
<Unlocking the Potential of Cation-Disordered Oxides for Rechargeable Lithium Batteries> Science, Jan. 31, 2014; vol. 343, p. 519-522.

* cited by examiner

*Primary Examiner* — Cynthia K Walls
(74) *Attorney, Agent, or Firm* — Gang Yu (57) ABSTRACT

A cathode active material and a Lithium-ion electrochemical system thereof are provided. The lithium-ion cathode material is described by $xLiMO_2 \cdot (1-x)(Li_aM'_{1-a})O_y$, M and M' independently comprises one or more metal ions that together have a combined average oxidation state between 3+ or 2+, $1 > x \geq 0.5$, $0.75 \geq a > 0$, $1 \geq y \geq 0.625$.

17 Claims, 8 Drawing Sheets

CATHODE ACTIVE MATERIAL AND LITHIUM-ION ELECTROCHEMICAL SYSTEM THEREOF

TECHNICAL FIELD

The disclosure relates to a cathode active material for Lithium-ion battery, and the application of said material in a Lithium-ion electrochemical system.

BACKGROUND

The lithium-ion battery, originally commercialized in the early 1990s, has come to dominate the energy storage market for hand held, electronic consumer devices. This is because the battery is rechargeable, and has high mass and volume energy density. Now lithium-ion batteries are also being extensively investigated for electric vehicle applications. In electric vehicles, an ideal battery cathode will have high capacity, high power, improved safety, long cycle life, low toxicity and lower production costs. Generally, cathode materials are unable to meet all these requirements.

For automotive applications in particular, the ideal cathode needs to offer high energy densities for the cell. Today, that typically means the use of layered transition metal oxides are used as the cathode, especially NMC and NCA compounds that offer competitive energy densities to the original LCO cathodes, but at a significantly lower cost due to the high price of Co. Recently, there has been increasing concern about cobalt in the battery cathode since its world reserves are limited and the costs are continuing to climb as electric vehicle sales increase.

New cathode structures for lithium-ion batteries, that do not rely on cobalt or any other high cost, inelastic metals is necessary so mass production is possible.

A cathode material that is significantly or completely void of cobalt in the material that can be a competitive alternative to Li-ion NMC, NCA, and LCO cathode materials.

In prior art U.S. Pat. No. 5,240,794B, a Li—Mn—O cathode structure is described that is composed of LMO or some composite structure. LMO, which has a cubic spinel structure, is limited to only 0-50% of Li adopting an intercalation storage site without causing significant, irreversible structural damage. This material type is commercialized and found in many Li-polymer batteries, but for automotive use it does not provide sufficient capacity to meet the desired high energy density.

Prior art U.S. Pat. No. 6,420,069B, describes a spinel cathode that is modified by partially substituting the Mn in LMO with another cation component with 2+ valency. In this way high voltage spinel, LNMO, is made possible. While the added voltage does make this material more attractive for cobalt free automotive applications, the voltage window is generally considered too great at present for electrolytes to cycle remain stable when coupled with a traditional, low cost graphite anode.

In prior art U.S. Pat. No. 6,391,493B, examples of cobalt free metal phosphate/sulfates is disclosed. In particular, LFP with the olivine structure is a well known commercial cathode. While there are some cells for automotive use, the materials low operating voltage and lower capacity compared to NMC and NCA make it undesirable.

Prior art U.S. Pat. No. 5,264,201B, describes layered cathode structure with binary compositions of $Li_yNi_xA_{2-x-y}O_2$, where metals such as Mn or Co fills the A site. These publications describe a layer cathode material that exists as a single material crystal phase. Maintaining a single phase during preparation is difficult, and often multiphase composite materials exist instead.

Prior art U.S. Pat. No. 6,660,432B describes a layered, single phase lithium-nickel-manganese-cobalt-oxide material. The material crystal structure is composed of a R-3m unit cell. U.S. Pat. No. 6,855,461 describes a material isostructural with $LiNiO_2$, except it is modified with the addition of cobalt, some transition metals, and some inactive alkaline earth components. The layer structure described in these patents suggest a pure phase with no specific structure or order for the Li and transition metals beyond the basic layer. This is difficult to realize in practice, since many cathode materials have non-homogeneous structures.

In prior arts U.S. Pat. Nos. 6,677,082B and 7,303,840B describe a composite cathode structure defined as $xLiMO_2*(1-x) Li_2MnO_3$ and $xLi_2MnO_3*(1-x)LiMn_{2-y}M_yO_4$, respectively. The composite structure is a result of Mn segregating into various ordered structures, since the structures share a nearly identical oxygen lattice. The $Li_2MnO_3$ incorporation provides some unique technical benefits, but it also has detractions such as poor conductivity, voltage fade, Mn dissolution, and gas formation.

U.S. Pat. No. 8,080,340B describes a more complex $x\{zLi_2MnO_3*(1-z)LiM'O_2\}*(1-x)LiMn_{2-y}M_yO_4$ material. The 3-phase composite is designed to improve the material conductivity by introducing more 3-d spinel pathways. Preparing this material is dependent upon the atomic composition and is difficult to prepare for compositions high in nickel content or low in cobalt content.

SUMMARY

The present disclosure is intended to provide a cathode active material and Lithium-ion electrochemical system thereof, so as to solve the problem above.

To this end, according to one aspect of the present disclosure, a lithium-ion cathode material is provided, wherein the lithium-ion cathode material is described by $xLiMO_2*(1-x)(Li_aM'_{1-a})O_y$, M and M' independently comprises one or more metal ions that together have a combined average oxidation state between 3+ or 2+, $1>x≥0.5$, $0.75≥a>0$, $1≥y≥0.625$.

Further, M and M' independently comprises one or more metal ions selected from Ni, Mn, Co, Al, Mg, Nb, Mo, or Zr.

Further, neither M nor M' comprises metal ion of Co.

Further, M and/or M' comprises metal ion of Co, and a molar ratio of metal ion of Co to M and M' is Co/(M+M')<0.1.

Further, the molar ratio of metal ion of Co to M and M' is Co/(M+M')<0.05.

Further, a molar ratio of metal ion Li to M and M' is Li/(M+M')>0.95.

Further, the molar ratio of metal ion Li to M and M' is 1.2>Li/(M+M')>1.

Further, M and/or M' comprises metal ion of Ni, and a molar ratio of metal ion of Ni to M and M' is Ni/(M+M')>0.5.

Further, the molar ratio of metal ion of Ni to M and M' is Ni/(M+M')>0.7.

According to another aspect of the present disclosure, a Lithium-ion electrochemical system, which comprises a cathode electrode, wherein the cathode electrode comprises the lithium-ion cathode material above.

The material is distinguished from prior arts by: the purposeful introduction of rocksalt structures to stabilize the material during cycling. The presence of rocksalt in the initial material reduces the potential oxygen release that can occur during a thermal decomposition event during cycling. A LiMO2 material can theoretically release up to/2 of its oxygen during thermal decomposition to form MO, but with the proposed $xLiMO_2*(1-x)(Li_aM'_{1-a})O_y$ structure x/2 is the theoretical maximum oxygen capable of being released from the structure.

BRIEF DESCRIPTION OF THE DRAWINGS

The drawings for constructing one part of the disclosure are used for providing the further understanding to the disclosure, schematic embodiments of the disclosure and descriptions thereof are used for explaining the disclosure, and do not intend to limit the disclosure inappropriately. In the drawings.

DETAILED DESCRIPTION OF THE EMBODIMENTS

It is to be noted that the embodiments in the disclosure and the features in the embodiments may be mutually combined in the case without conflict. The disclosure is explained in detail with reference to the drawings in combination with the embodiments below.

A lithium-ion cathode material described by $xLiMO_2*(1-x)(Li_aM'1-a)O_y$ is described, wherein M and M' independently comprises one or more metal ions that together have a combined average oxidation state between 3+ or 2+, $1>x\geq0.5$, $0.75\geq a>0$, $1\geq y\geq0.625$.

In a preferred embodiment, M and M' independently comprises one or more metal ions selected from Ni, Mn, Co, Al, Mg, Nb, Mo, or Zr.

Preferably, neither M nor M' comprises metal ion of Co.

Preferably, M and/or M' comprises metal ion of Co (M comprises metal ion of Co, or M' comprises metal ion of Co, or both M and M' comprise metal ion of Co), and a molar ratio of metal ion of Co to M and M' is Co/(M+M')<0.1. In a preferred embodiment, the molar ratio of metal ion of Co to M and M' is Co/(M+M')<0.05.

In a preferred embodiment, a molar ratio of metal ion Li to M and M' is Li/(M+M')>0.95. Preferably, the molar ratio of metal ion Li to M and M' is 1.2>Li/(M+M')>1.

In a preferred embodiment, M and/or M' comprises metal ion of Ni (M comprises metal ion of Ni, or M' comprises metal ion of Ni, or both M and M' comprise metal ion of Ni), and a molar ratio of metal ion of Ni to M and M' is Ni/(M+M')>0.5. Preferably, the molar ratio of metal ion of Ni to M and M' is Ni/(M+M')>0.7.

According to an other aspect of the present disclosure, a Lithium-ion electrochemical system, which comprises a cathode electrode, wherein the cathode electrode comprises the lithium-ion cathode material above.

The relationship between low cobalt content and the formation of a two phase structure, in particular when the lithium:metal content is greater than 1:1, the cobalt:metal content is below 0.1:1.

The formation of two phase structure is more likely to occur when nickel:metal content is greater than 0.5:1.

Removal of the cobalt content form the cathode active material increases the occurrence of the $Li_aM'_{1-a}O_y$ compound. This compound will not have clear lithium transition metal ordering when investigated with techniques such as TEM or STEM.

The rocksalt structure forms when cobalt is removed or decreased, and nickel is high in the material. Ni3+ and Ni4+ are known to be less stable in lithium ion layered cathodes, and result in more severe oxidation reactions with the electrotype during synthesis. During the oxidation the material is trying to adopt a more stable NiO structure so $Ni^{2+}$ can be formed. When greater levels of Mn are present Ni is stabilized by forming a $Ni^{2+}/Mn^{4+}$ couple within the structure, somewhat alleviating the instability of the active material. Cobalt is historically added to lithium ion cathodes because it is believed to aid in material conductivity, which can be explained by helping to stabilize the structure so there is less transition metals in the layered components lithium diffusion plane. However, recent reports (Science, vol 343, 519-522, 2014) have shown that eliminating the transition metal within the lithium layer is not necessary as long as sufficient Li:M ratio can exist in the disordered rocksalt structures such as $Li_aM'_{1-a}O_y$.

The $xLiMO_2*(1-x)(Li_aM'_{1-a})O_y$ structure imparts some of the features of each material into the final material particle. The $LiMO_2$ phase has a 2-d pathway for Li-ions during intercalation which help creates pathways for Li within the structure to reach the active surface to flux into the electrolyte. The disordered rocksalt, meanwhile, alters the gravimetric capacity of the material, since the disordered rocksalt has a lower molecular mass then $LiMO_2$. During thermal decomposition the $LiMO_2$ typically goes from the layered structure, thru an intermediate spinel phase, and then finally a rocksalt structure. Since the rocksalt structure is already a part of the active material less opportunity for oxygen evolution and exothermic heat release during thermal decomposition exists, which may lead to improved safety.

The material described is not limited to a specific process for formation of the precursor materials necessary to make the final active structure, but in general will occur from the mixing of a metal precursor with a lithium precursor, and then calcining the mixture at high temperature. The lithium precursor may be Li metal, lithium hydroxide, lithium acetate, lithium carbonate, or other lithium containing species that decompose during calcination. The metal precursor could come from grinding of metal oxides, co-precipitation, sol-gel, spray drying, or other preparation techniques.

The most commercial way to make precursors is to use co-precipitation between a transition metal cation salt, which is at least slightly acidic, and a dissolved basic salt that form a solid as the acid base neutralization reaction occurs. This method of production generally has the following features:

The starting cation salt has an anion that is a sulfate, nitrate, chloride, fluoride, bromide, or acetate. Preferably the cation salt concentration is between 0-6M when dissolved in an aqueous solution, and will be a mixture of the desired nickel, manganese, cobalt, aluminium, titanium or any other transition metal that is desired to be precipitated into the final compound.

The selected base for precipitation is selected from sodium hydroxide, potassium hydroxide, lithium hydroxide, sodium carbonate, sodium oxalate, oxalic acid, sodium citrate or ammonium hydroxide. The base solution will have a concentration from 0-14M, and will typically be fed in a near stoichiometric ratio to form the desired final solid coprecipitation product.

The reactions will typically have a chelation species present in the solution. Typical chelation agents are aqua ammonia, ammonia sulfate, ammonia acetate, ammonia oxalate, ammonia nitrate, quaternary ammonium salts.

The precipitation reaction is typically done under an inert atmosphere such as nitrogen so oxidation does not occur to the formed solid during the co-precipitation reaction.

The coprecipitation reaction occurs in a stirring vessel with temperature between 10-120° C., with a preferred range of 40-90° C., and a more preferred range from 45-60° C.

Depending upon the co-precipitation process; the solid product being formed may be a batch reaction, semi-batch reaction or a continuous reaction. Typically there will be some form of mechanical agitation to ensure good mixing of the transition metal cations solutions and the reactive base. Mechanical mixing is not required, however, as certain precipitation reactor that use the fluid momentum such as a impinging jet could be used to make the particles.

The prepared co-precipitated particles, which are the precursor to making the final active material; could be uniform in composition or have a concentration gradient in some or all of the particle structure. The change in concentration of the cation ratio within the secondary particle maybe gradual or abrupt. In some iterations the cobalt location maybe concentrated in the interior of the precursor particle. In some iterations the cobalt location maybe concentrated toward the surface of the precursor particle. In some iterations the cobalt content maybe constant thru the precursor particle. There is no restriction on the local cobalt (or other transition metal) concentrations when a concentration gradient particle is made, as long as the nominal composition ratio adheres to the range restrictions defined for the composite cathode.

The collected co-precipitation materials will be collected from the reactor solution thru filtration, and then washed with copious amounts of water to remove any residual, soluble salts. The precursor is then dried form 70-5000° C. for 1-2,400 minutes in a vacuum, inert, or air atmosphere. Preferably the drying temperature is from 100-300° C. During the drying some precursors may undergo reaction to form a partial or complete metal oxide.

Another conceived way to prepare the cathode precursor is thru the solid state reaction of metal oxide ores. These ores include, but are not limited to: NiO, $NiCo_2O_4$, $Co_3O_4$, $CoNi_2O_4$, $NiMnO_3$, MnO, CoO, $CoMn_2O_4$, $MnO_2$ and $Mn_2O_3$.

The ores would be ground together thru mechanical crushing and milling, such as a ball mill, and then calcined from 500-1,200° C. to help mix the metal composition more evenly thru the mixture. This precursor oxide may need to be ground and calcined multiple times to get the desired precursor.

Once the desired transition metal precursor is ready, a lithium sources selected from LiOH, $Li_2CO_3$, lithium acetate, lithium sulfate, $Li_2O$, $Li_2O_2$, lithium oxalate, lithium citrate, lithium foil, lithium chloride, lithium bromide or lithium fluoride, will be mixed in the desired atomic ratio to the transition metal content in the precursor. This mixed solids are then calcined together to form a lithium metal oxide structure with the inventive composition.

In some cases it is preferred that the precursor and lithium source mixture is calcined in multiple steps. The first step is typically done between 400-7000° C. and over a period of 1 hr to 48 hrs, preferably less than 24 hours.

To induce the rocksalt component into the structure the primary calcinations will occur from 600-900° C. and over a period of 1 hr to 48 hr, preferably from 5 hr to 24 hr. The atmosphere for the calcination maybe air, oxygen, or a mixture of the two.

In the inventive material the rocksalt phase is partially driven to form by the limited presence, or potentially absence of the Co atom in the material.

The preparation temperature may also influence the performance of the ordered-disordered layer-rocksalt structure described. For high nickel materials low temperatures compared to LCO or NMC materials are often used, which helps keep the cation/Li intermixing of the rocksalt structure high. At high temperatures, the rocksalt may become more ordered, as MO, but it is because the Li is being expelled from the structure and evaporating due to the high temperatures.

The active material will be used in the electrode of an electrochemical device capable of storing and later releasing energy. The active material electrode will be formed by casting the active material, and any other compounds in the preparation slurry, onto a solid or porous substrate. The substrate should be able to conduct electrical current. Other materials that may be in the electrode slurry during casting are the suspending solvent, such as NMP or water; a binder; and a conductive material, typically carbon, to help transfer heat and electricity thru the electrode.

Figure 1:
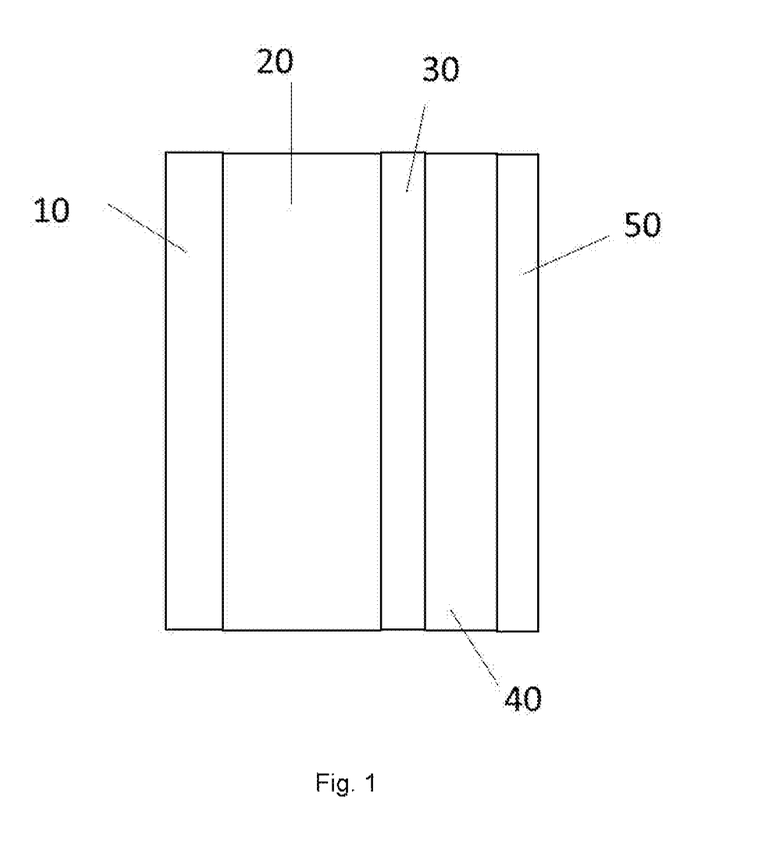
FIG. 1 shows a structure schematic diagram of electrochemical cell comprising cathode active material. The above drawings include the following drawing marks: 10—cathode current collector; 20—cathode electrode; 30—separator; 40—anode electrode; 50—anode current collector.

The electrode will be used in an electrochemical cell that comprises an anode, cathode, electrolyte and separator. For example, as showed in FIG. 1, the electrochemical cell comprises cathode current collector 10, cathode electrode 20, separator 30, anode electrode 40 and anode current collector 50. The cell can further be comprised in series or in parallel or in some combination with other cells to form an electrochemical device. The active material electrode may also be used in a multi-polar configuration.

A cathode active material for lithium-ion batteries, that can reversibly cycle between the charged and discharged state within a given electrochemical potential. Reducing, or ideally eliminating, the cobalt content in the lithium ion battery cell is necessary for mass adoption of electric vehicles given the insufficient and high cost of cobalt reserves worldwide. The $xLiMO_2*(1-x)(Li_aM'_{1-a})O_y$ is a structure highly compatible with nickel-rich, cobalt free material.

The presence of rocksalt in the initial material reduces the potential oxygen release that can occur during a thermal decomposition event during cycling. A $LiMO_2$ material can theoretically release up to ½ of its oxygen during thermal decomposition to form MO, but with the proposed $xLiMO_2*$ $(1-x)(Li_aM'_{1-a})O_y$ structure x/2 is the theoretical maximum oxygen capable of being released from the structure.

The disclosure will be further described below in detail with reference to specific embodiments, and these embodiments may not be understood to limit the required scope of protection of the disclosure.

Example 1

In a 20 L reactor the co-precipitation of 2M metal sulfate solution composed of $NiSO_4$, $Mn_SO4$ and $CoSO_4$ in a molar ratio of 85:12:3 was pumped at a rate of 0.5 L/hr into an initial volume of 5 L of 0.1M aqua ammonia heated at 500° C. that was being bubbled and under a nitrogen tank head. Simultaneously to the metal sulfate addition 1 M $Na_2CO_3$ was pumped into the reactor to control the pH at 8, and 9.6M aqua ammonia solution was also pumped into the solution at 0.03 L/hr. After the metal sulfate solution reactants were completely fed to the reactor, the mixture was collected via filtration and washed using copious amounts of water until a filter cake of metal carbonate $Ni_{0.85}Co_{0.03}Mn_{0.12}CO_3$ (NMC85) was collected. The metal carbonate was dried under nitrogen overnight at 1000° C.

To prepare the cathode active material 1.1:1 Li:(NMC85) mol ratio was prepared using lithium hydroxide monohydrate that was ground with the $Ni_{0.85}Co_{0.02}Mn_{0.13}CO_3$ precursor for 2 minutes and then heat treated at 5800° C. for 12 hours with a heating rate of 20° C./min. The resulting powder was grounded in a mortar and pestle before being re-fired at 7900° C. for 18 hours, the heating and cooling rates being 2° C./min. If we assume Ni2.75+ in the layered portion of the composite, the composite notation could come to $0.65(LiNi_{0.839}Mn_{0.146}Co_{0.036}O_2)*0.35(Li_{0.63}Ni_{0.36}O_{0.68})$.

Example 2

The same procedure as Example 1 was used to prepare the precursor carbonate. The carbonate $Ni0.85Mn_{0.12}Co_{0.03}CO_3$ was calcined in air at 6000° C. for 6 hours. The resulting powder was mixed with $LiOH—H_2O$ in ethanol at a Li:(NMC) ratio of 1:1. The powders were mixed for 3 hours with a stir bar before being dried at 900° C. The dried mixture was heated at 5500° C. for 6 hours, cooled and re-ground, and then heat treated again at 8500° C. for 18 hours.

If we assume Ni2.75+ in the layered portion of the composite, the composite notation could come to $0.72(LiNi_{0.841}Mn_{0.144}Co_{0.036}O_2)*0.28(Li_{0.53}Ni_{0.47}O_{0.74})$.

Example 3

The same procedure as Example 2 was used except the Li:(NMC) ratio was 1.1:1.

If we assume Ni2.6+ in the layered portion of the composite, the composite notation could come to $0.53(LiNi_{0.85}Mn_{0.17}Co_{0.04}O_2)*0.47(Li_{0.61}Ni_{0.39}O_{0.69})$.

Example 4

The same procedure as Example 2 was used except the Li:(NMC) ratio was 1.2:1.

If we assume $Ni^{2.75+}$ in the layered portion of the composite, the composite notation could come to $0.62(LiNi_{0.845}Mn_{0.14}Co_{0.35}O_2)*0.38(Li_{0.715}Ni_{0.28}O_{0.642})$.

Counter Example 1

In a 4 L reactor the co-precipitation of 2M metal sulfate solution composed of $NiSO_4$, $MnSO_4$ and $CoSO_4$ in a molar ratio of 80:10:10 was pumped at a rate of 0.125 L/hr into an initial volume of 3.5 L of 0.8M aqua ammonia heated at 500° C. that was being bubbled and under a nitrogen tank head. Simultaneously to the metal sulfate addition 4M NaOH was pumped into the reactor to control the pH at 10.8, and 5N aqua ammonia solution was also pumped into the solution at 0.04 L/h·r. After the metal sulfate solution reactants were completely fed to the reactor, the mixture was collected via filtration and washed using copious amounts of water until a filter cake of $Ni_{80}Mn_{10}Co_{10}CO_3$ (NMC811) metal carbonate was collected. The hydroxide was dried overnight at 1000° C.

The dried precursor powder was mixed with lithium hydroxide monohydrate at a molar Li:(NMC811) ratio of 1:1 and ground by spices grinder for 2 minutes. The precursor mixtures were heated in air using a 20° C./min. ramp for 10 hours at 7700° C.

Electrochemical Preparation and Assembly

The electrochemical performance of the materials was tested in coin cells. Slurries were made using 90 wt % active material, 5.5 wt % Carbon Black, and 4.5 wt % PVDF with a suitable added amount of NMP. Using a doctor blade coater, the resulting slurries were cast on an Aluminum foil and further dried in an oven at 90° C. for 30 min. The cast electrode was punched and the 15 mm electrodes were dried overnight at 85° C. under vacuum. To evaluate the electrochemical performances, 2025 coin-type half cells using lithium metal anode were assembled in an Argon-filled glove box. The anode and cathode had one layer of Celgard separator in between. The electrolyte used is 1M LiPF6 in ethylene carbonate (EC), diethyl carbonate (DEC), and dimethyl carbonate (DMC) (1:1:1 in volume) with vinylene carbonate (VC) additive. All the electrochemical performance tests are conducted with an Arbin instrument at 25° C. The coin cells were first cycled at C/20 rate between 2.2 and 4.6V vs. Li/Li+, followed by C/10 rate with [2.7-4.4V] voltage window vs. Li/Li+.

X-Ray Diffraction Analysis

The prepared materials were tested using a PANanalytical Empyrean instrument with Cu K alpha radiation. The instrument is equipped with a X'Celerator Multi-Element Detector for Rapid Data Acquisition. X-ray diffraction spectra were recorded over 15 to 70 2-theta in 0.0330 increments for 0.18 seconds per step. Some samples were mixed with graphite during preparation to make sure peak shifts were properly aligned.

Figure 2:
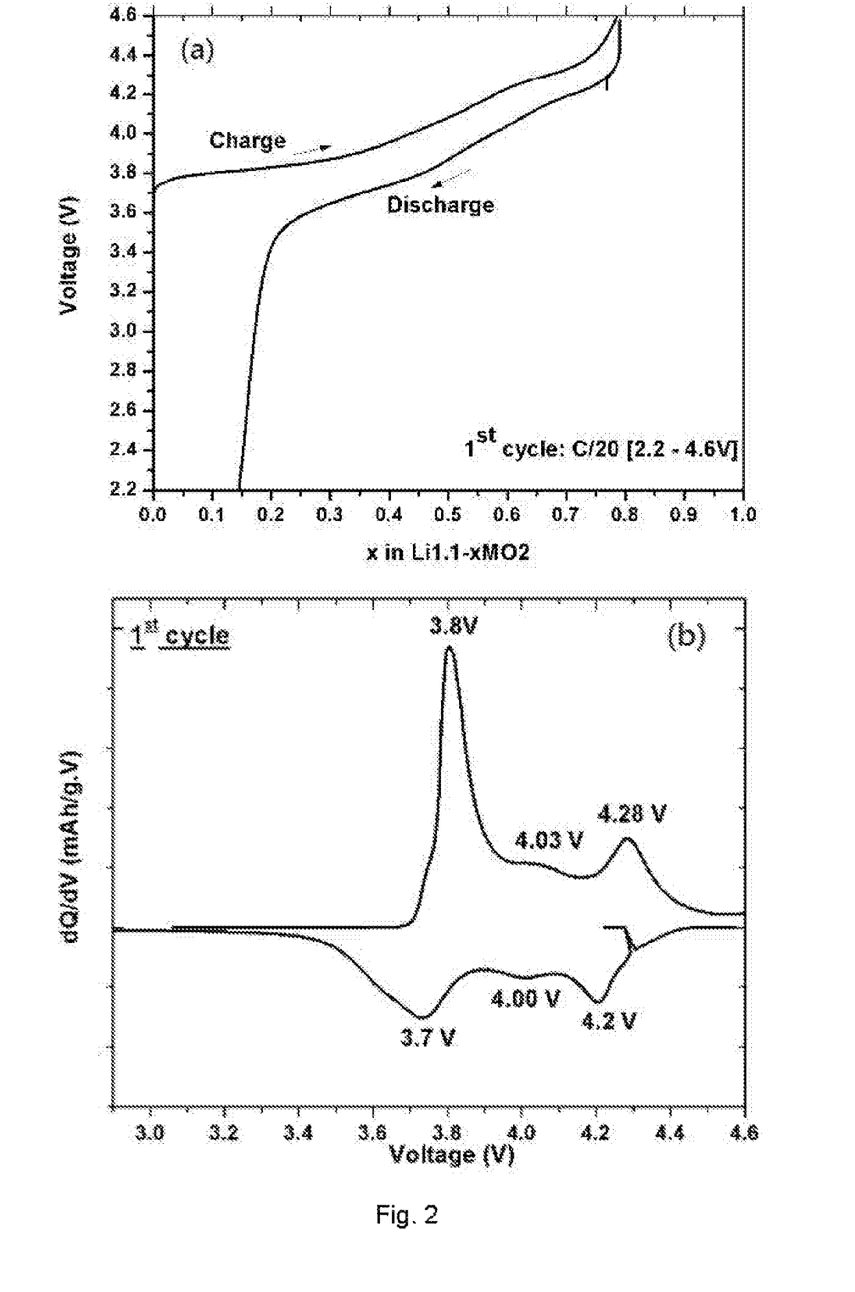
FIG. 2 shows Embodiment 1 First cycle voltage curve (a) and corresponding dQ/dV (b).

FIG. 2: Example 1 First cycle voltage curve (a) and corresponding dQ/dV (b), which shows no presence of $Li_2MnO_3$ phase during charge despite Li/M ratio being 1.1.

Figure 3:
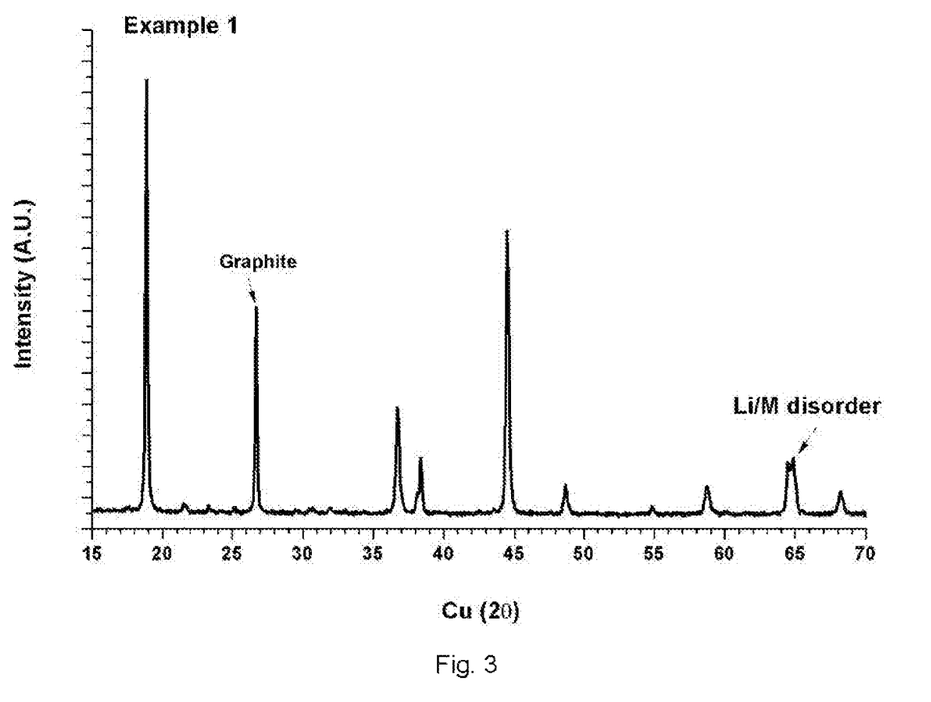
FIG. 3 shows Embodiment 1 Powder x-ray diffraction pattern showing Li/M disorder present instead of a pristine layered structure.

FIG. 3: Example 1 Powder x-ray diffraction pattern showing Li/M disorder present instead of a pristine layered structure. A pristine layer material would have two distinct peaks at 63-65 2 theta which would correspond to the (108) and (110) planes.

Figure 4:
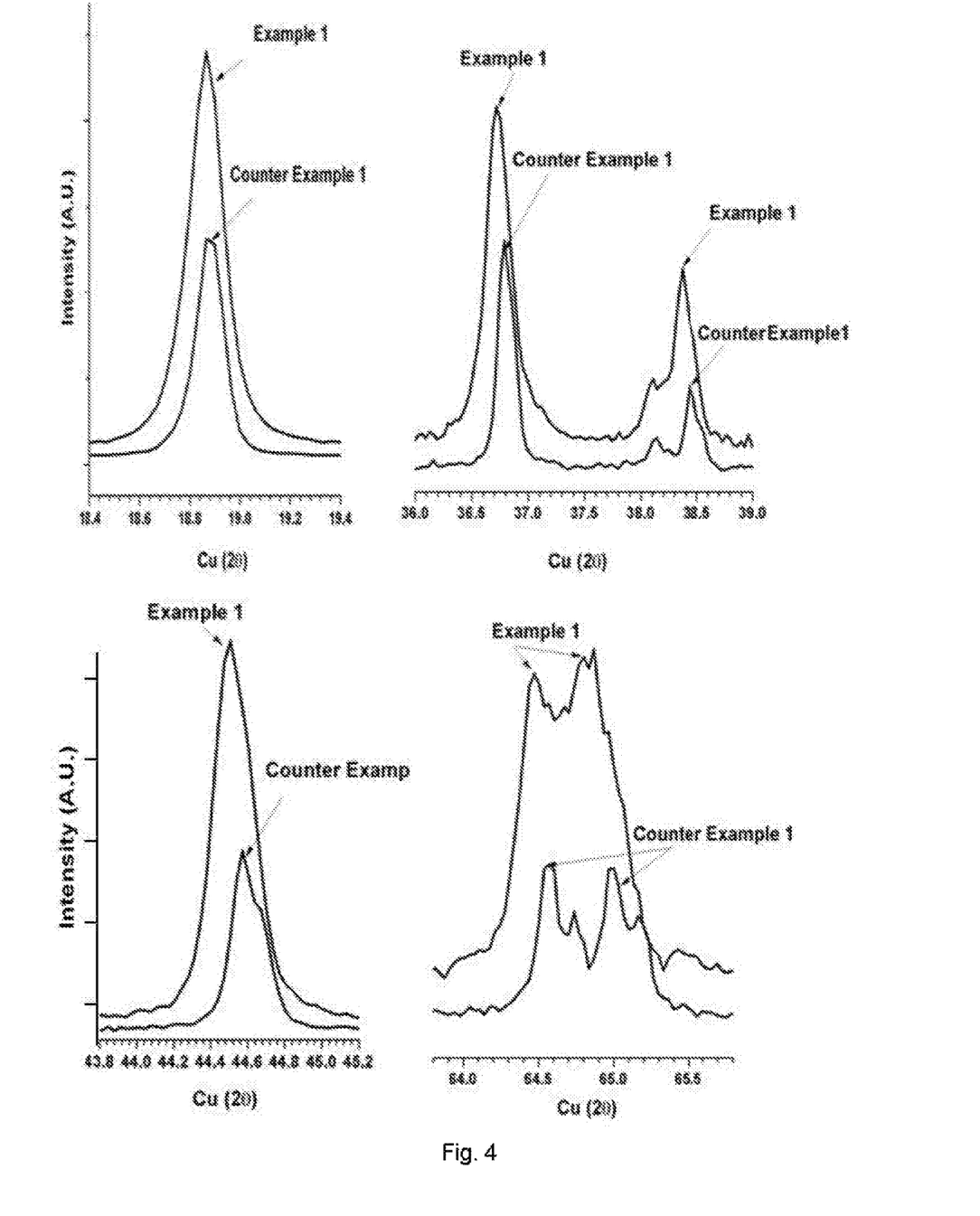
FIG. 4 shows Embodiment 1 XRD results of counter example 1 versus Embodiment 1.

FIG. 4: Example 1 XRD results of Counter Example 1 versus Example 1.

Figure 5:
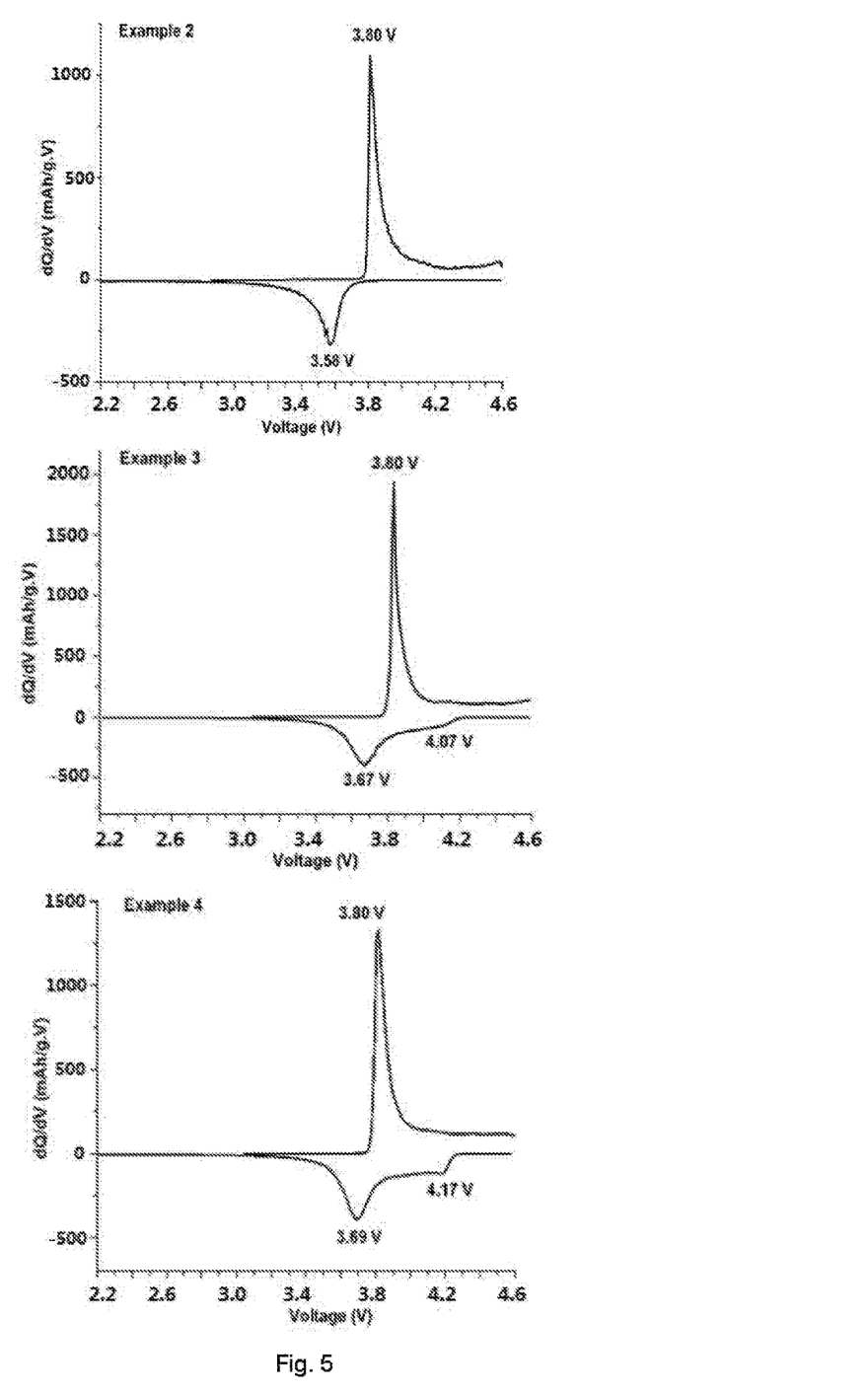
FIG. 5 shows Embodiments 2, 3 and 4 the C/20 rate dQ/dV plots of the first cycle between the 2.2-4.6V window. In all three materials no peak is observed from 4.4-4.6V during the first charge.

FIG. 5: Examples 2, 3 and 4 the C/20 rate dQ/dV plots of the first cycle between the 2.2-4.6V window. In all three materials no peak is observed from 4.4-4.6V during the first charge.

Figure 6:
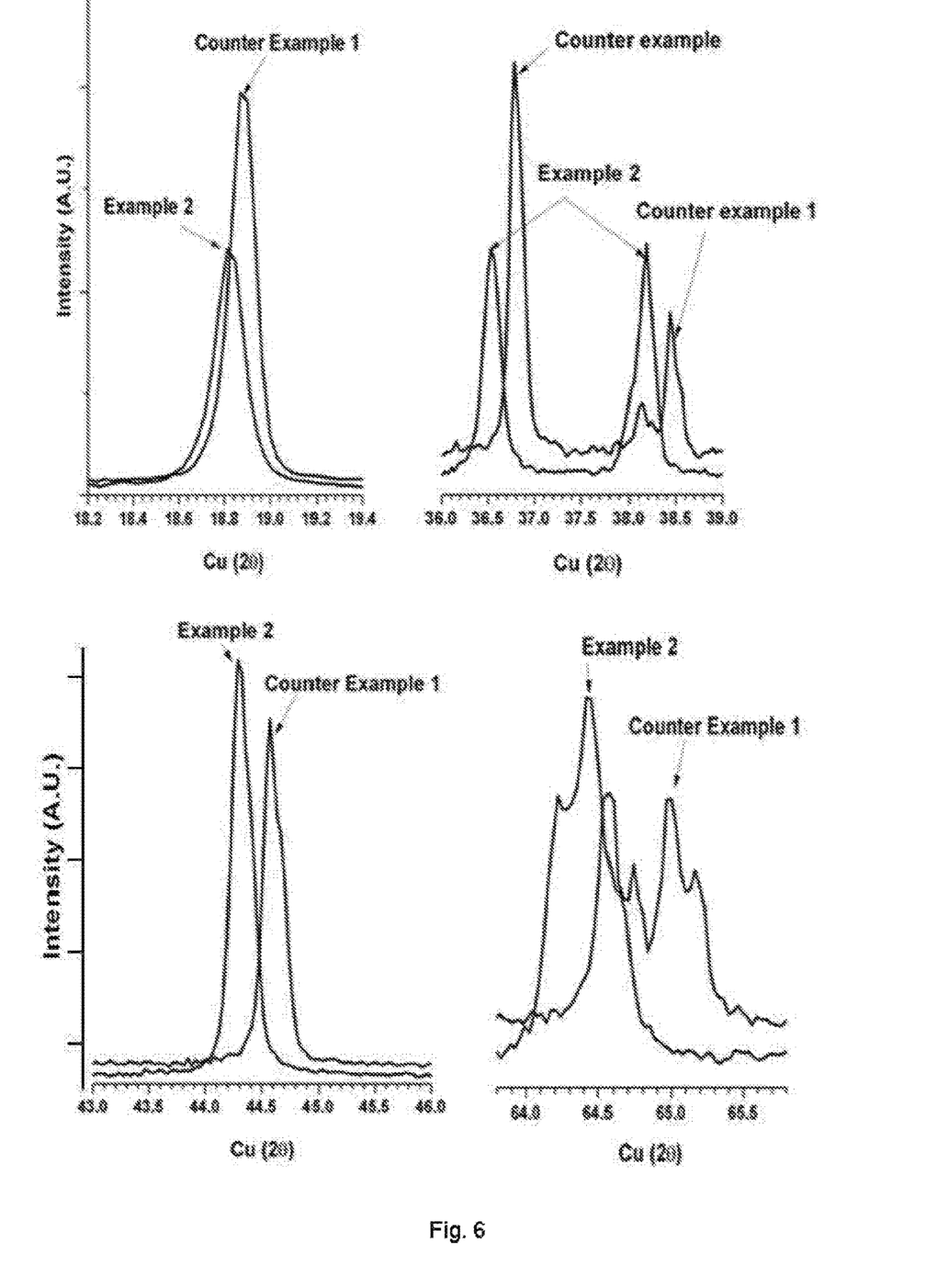
FIG. 6 shows selected x-ray diffraction peaks comparing Embodiment 2 with Counter Example 1.

FIG. 6: Selected x-ray diffraction peaks comparing Example 2 with Counter Example 1.

Figure 7:
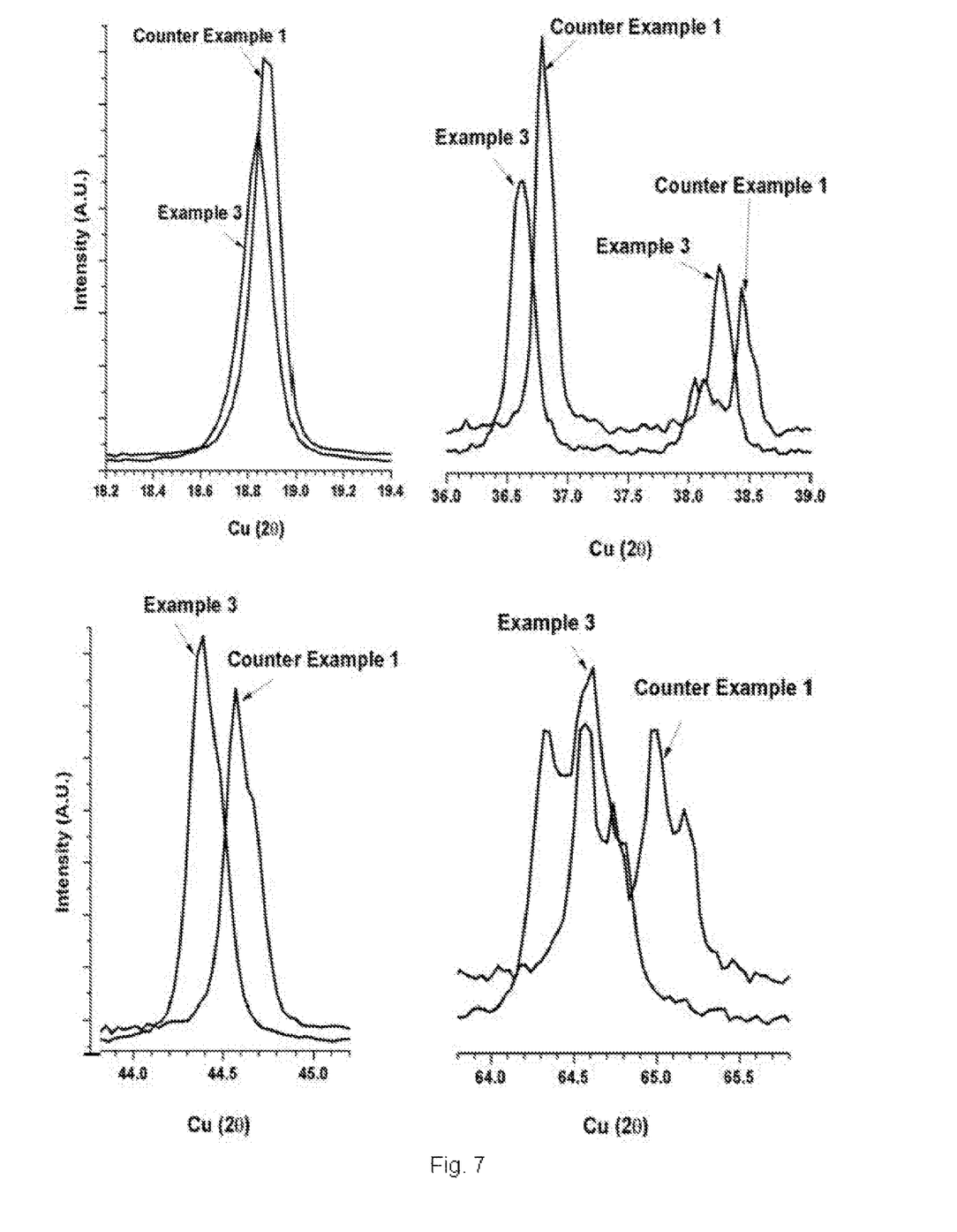
FIG. 7 shows selected x-ray diffraction peaks comparing Embodiment 3 with Counter Example 1.

FIG. 7: Selected x-ray diffraction peaks comparing Example 3 with Counter Example 1.

Figure 8:
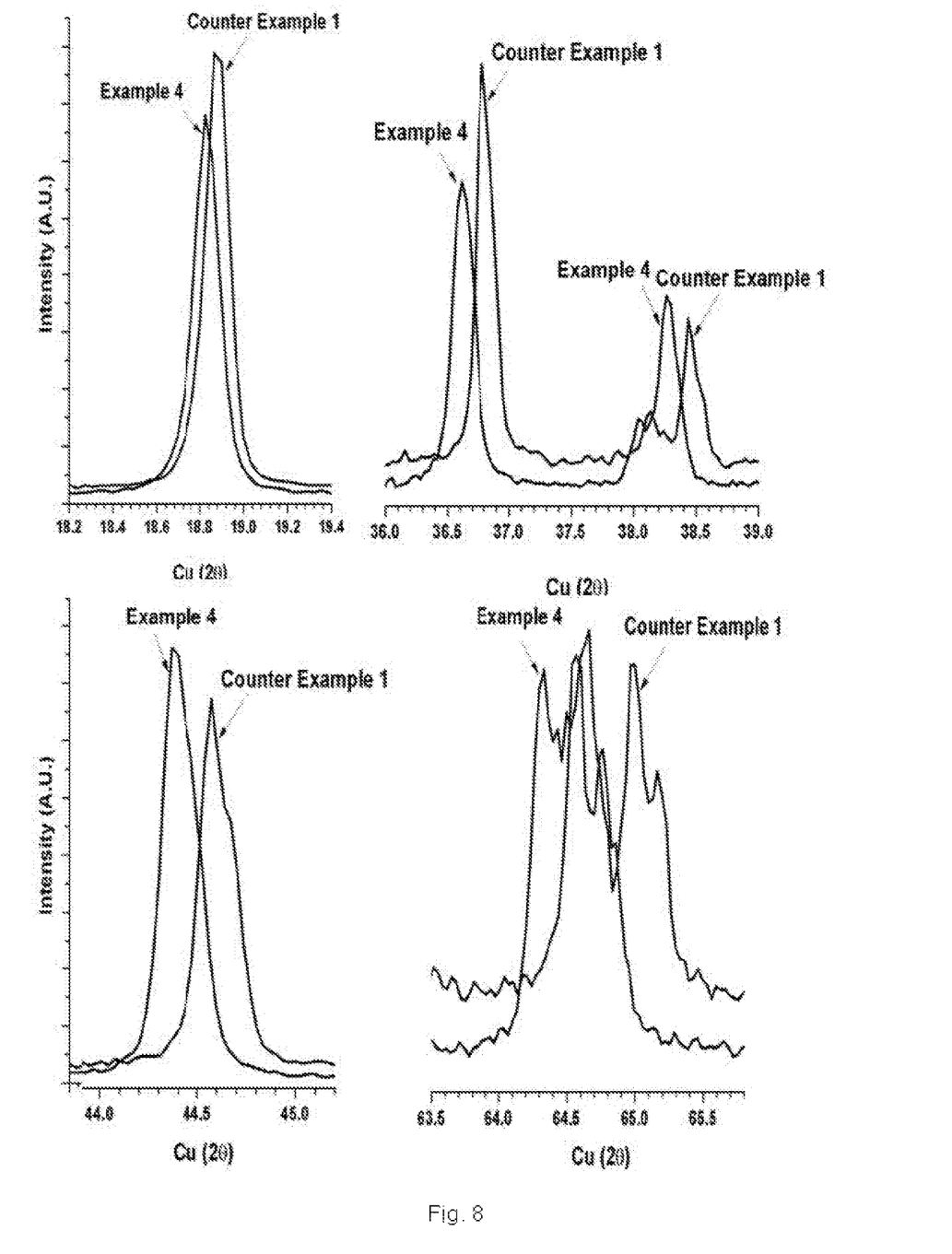
FIG. 8 shows selected x-ray diffraction peaks comparing Embodiment 4 with Counter Example 1.

FIG. 8: Selected x-ray diffraction peaks comparing Example 4 with Counter Example 1.

TABLE 1

Table 1: Table of important miller indicies and ther corresponding peak position recorded in XRD for Counter Example 1, Example 1, Example 2, Example 3 and Example 4. Also in the table is a reference of strong miller indicies for a pure rocksalt structure.

| (hkl) | 003 | 101 | 104 | 018 | 110 |
|---|---|---|---|---|---|
| $LiNi_{0.8}Mn_{0.1}Co_{0.1}O_2$ Counter Example 1 | 18.88 | 36.78 | 44.57 | 64.57 | 64.98 |
| $Li_{1.1}Ni_{0.85}Co_{0.03}Mn_{0.12}O_2$ Embodiment 1 | 18.87 | 36.72 | 44.50 | 64.47 | 64.82 |
| $LiNi_{0.85}Co_{0.03}Mn_{0.12}O_2$ Embodiment 2 | 18.83 | 36.53 | 44.30 | 64.22 | 64.43 |
| $Li_{1.1}Ni_{0.85}Co_{0.03}Mn_{0.12}O_2$ Embodiment 3 | 18.85 | 36.61 | 44.37 | 64.33 | 64.61 |
| $Li_{1.2}Ni_{0.85}Co_{0.03}Mn_{0.12}O_2$ Embodiment 4 | 18.83 | 36.61 | 44.38 | 64.32 | 64.63 |
| (hkl) | | 111 | 200 | 220 | |
| Rocksalt | | 37.04 | 43.03 | 62.48 | |

Available Oxygen Loss Calculations

The proposed structural formula was considered under the conditions proposed. At all times the charge of a material must balance to zero; while lithium and oxygen atoms are known to have a +1 and −2 oxidation state, respectively. Knowing the charge of lithium and oxygen it is possible to calculate the average oxidation state of the metal cation component in the structure because charge neutrality must be maintained. During the decomposition of lithium metal oxide cathode materials, the metal oxide atoms can reduce to at most 2+ oxidation state if only Ni, Mn and Co are present as the metal species. Therefore; the difference between the average oxidation state of the composite layer-rocksalt material and the oxygen loss to be charged neutralized with 2+ oxidation on the metal is the maximum O loss from the compounds stoichiometry. This calculation can be done for the discharged material, or if the inventive material Li was extracted to its physical limit (ie the cathode is charged in the lithium ion battery). The physical limit is taken to be all the Li is extracted from the material or the metal oxidation state reaches 4+ in this material.

TABLE 2

Table 2: $xLiMO_2 * (1 - x)(Li_aM'_{1-a})O_y$ variations and the theoretical M oxidation state and calculated oxygen release for a comparative $LiMO_2$ material versus the proposed composite structure.

| | | L:(M + M'):O Ratio | | | M + M' Discharged Average Oxidation | O/(M + M') Loss Needed to Reach M = 2+ Oxidation State |
|---|---|---|---|---|---|---|
| x | a | Li | M + M' | O | | |
| 0.50 | 0.00 | 0.50 | 1.00 | 1.50 | 2.50 | 0.25 |
| 0.50 | 0.25 | 0.63 | 0.88 | 1.44 | 2.57 | 0.29 |
| 0.50 | 0.50 | 0.75 | 0.75 | 1.38 | 2.67 | 0.33 |
| 0.50 | 0.75 | 0.88 | 0.63 | 1.31 | 2.80 | 0.40 |
| 0.60 | 0.00 | 0.60 | 1.00 | 1.60 | 2.60 | 0.30 |
| 0.60 | 0.25 | 0.70 | 0.90 | 1.55 | 2.67 | 0.33 |
| 0.60 | 0.50 | 0.80 | 0.80 | 1.50 | 2.75 | 0.38 |
| 0.60 | 0.75 | 0.90 | 0.70 | 1.45 | 2.86 | 0.43 |
| 0.70 | 0.00 | 0.70 | 1.00 | 1.70 | 2.70 | 0.35 |
| 0.70 | 0.25 | 0.78 | 0.93 | 1.66 | 2.76 | 0.38 |
| 0.70 | 0.50 | 0.85 | 0.85 | 1.63 | 2.82 | 0.41 |
| 0.70 | 0.75 | 0.93 | 0.78 | 1.59 | 2.90 | 0.45 |
| 0.80 | 0.00 | 0.80 | 1.00 | 1.80 | 2.80 | 0.40 |
| 0.80 | 0.25 | 0.85 | 0.95 | 1.78 | 2.84 | 0.42 |
| 0.80 | 0.50 | 0.90 | 0.90 | 1.75 | 2.89 | 0.44 |
| 0.80 | 0.75 | 0.95 | 0.85 | 1.73 | 2.94 | 0.47 |
| 0.90 | 0.00 | 0.90 | 1.00 | 1.90 | 2.90 | 0.45 |
| 0.90 | 0.25 | 0.93 | 0.98 | 1.89 | 2.92 | 0.46 |
| 0.90 | 0.50 | 0.95 | 0.95 | 1.88 | 2.95 | 0.47 |
| 0.90 | 0.75 | 0.98 | 0.93 | 1.86 | 2.97 | 0.49 |
| 1.00** | 0.00 | 1.00 | 1.00 | 2.00 | 3.00 | 0.50 |

**This compound is comparative example of a pure $LiMO_2$ material with no rocksalt present.

TABLE 3

Table 3: $xLiMO_2 * (1 - x)(Li_aM'_{1-a})O_y$ variations and the theoretical M oxidation state if a complete 100% charge occurred and calculated oxygen release for a charged compound versus a non-composite layered material.

| | | L:(M + M'):O Ratio | | | M + M' Maximum Charged Oxidation State | O/(M + M') Released For M = 2+ Oxidation State |
|---|---|---|---|---|---|---|
| x | a | Li | M + M' | O | | |
| 0.50 | 0.00 | 0.50 | 1.00 | 1.50 | 3.00 | 0.50 |
| 0.50 | 0.25 | 0.71 | 1.00 | 1.64 | 3.29 | 0.64 |
| 0.50 | 0.50 | 1.00 | 1.00 | 1.83 | 3.67 | 0.83 |
| 0.50 | 0.75 | 1.40 | 1.00 | 2.10 | 4* | 1.00 |
| 0.60 | 0.00 | 0.60 | 1.00 | 1.60 | 3.20 | 0.60 |
| 0.60 | 0.25 | 0.78 | 1.00 | 1.72 | 3.44 | 0.72 |
| 0.60 | 0.50 | 1.00 | 1.00 | 1.88 | 3.75 | 0.88 |
| 0.60 | 0.75 | 1.29 | 1.00 | 2.07 | 4* | 1.00 |
| 0.70 | 0.00 | 0.70 | 1.00 | 1.70 | 3.40 | 0.70 |
| 0.70 | 0.25 | 0.84 | 1.00 | 1.80 | 3.59 | 0.80 |
| 0.70 | 0.50 | 1.00 | 1.00 | 1.91 | 3.82 | 0.91 |
| 0.70 | 0.75 | 1.19 | 1.00 | 2.05 | 4* | 1.00 |
| 0.80 | 0.00 | 0.80 | 1.00 | 1.80 | 3.60 | 0.80 |
| 0.80 | 0.25 | 0.89 | 1.00 | 1.87 | 3.74 | 0.87 |
| 0.80 | 0.50 | 1.00 | 1.00 | 1.94 | 3.89 | 0.94 |
| 0.80 | 0.75 | 1.12 | 1.00 | 2.03 | 4* | 1.00 |
| 0.90 | 0.00 | 0.90 | 1.00 | 1.90 | 3.80 | 0.90 |

TABLE 3-continued

Table 3: $xLiMO_2*(1-x)(Li_aM'_{1-a})O_y$ variations and the theoretical M oxidation state if a complete 100% charge occurred and calculated oxygen release for a charged compound versus a non-composite layered material.

| | | Discharged L:(M + M'):O Ratio | | | M + M' Maximum Charged Oxidation State | O/(M + M') Released For M = 2+ Oxidation State |
|---|---|---|---|---|---|---|
| x | a | Li | M + M' | O | | |
| 0.90 | 0.25 | 0.95 | 1.00 | 1.94 | 3.87 | 0.94 |
| 0.90 | 0.50 | 1.00 | 1.00 | 1.97 | 3.95 | 0.97 |
| 0.90 | 0.75 | 1.05 | 1.00 | 2.01 | 4* | 1.00 |
| 1.00** | 0.00 | 1.00 | 1.00 | 2.00 | 4.00 | 1.00 |

*Maximum oxidation state is 4+ for metal.
**This compound is comparative example of a pure $LiMO_2$ material with no rocksalt present.

From Table 2 and Table 3, when x=1 it corresponds to a pure, single phase layered structure. With no rocksalt present, that composition corresponds to the maximum oxygen release, because upon full charge the cathode average oxidation state is highest. As x increases for a give a, the oxygen loss potential increases; and when x is fixed and a increases the oxygen loss potential increases.

TABLE 4

Conversion of the loading metal ratios to the composite notation. The composite notation is solved assuming the Ni oxidation in the layer portion is adjusted form 2.4+, 2.6+, 2.8+ and 3+.

| | | $Li_{1.1}Ni_{0.85}Mn_{0.12}Co_{0.03}O_z$ | | | | | | | |
|---|---|---|---|---|---|---|---|---|---|
| | | x[Li(Ni:Mn:Co:O)] | | | | $(1-x)[Li_aM_{(1-a)}O_y$ | | | |
| x | a | Li | Ni | Mn | Co | O | Li | Ni | $O_y$ |
| 0.51 | 0.64 | 1.00 | 0.90 | 0.18 | 0.04 | 2.00 | 0.64 | 0.36 | 0.68 |
| 0.53 | 0.61 | 1.00 | 0.85 | 0.17 | 0.04 | 2.00 | 0.61 | 0.39 | 0.69 |
| 0.54 | 0.58 | 1.00 | 0.80 | 0.16 | 0.04 | 2.00 | 0.58 | 0.42 | 0.71 |
| 0.56 | 0.55 | 1.00 | 0.75 | 0.16 | 0.04 | 2.00 | 0.55 | 0.45 | 0.73 |

The above are merely the optional embodiments of the disclosure and not intended to limit the scope of protection of the disclosure. For those skilled in the art, the disclosure may have various modifications and variations. Any modifications, equivalent replacements, improvements and the like made within the spirit and principle of the disclosure shall fall within the scope of protection of the disclosure.

What is claimed is:

1. A lithium-ion cathode material, wherein the lithium-ion cathode material is described by $xLiMO_2*(1-x)(Li_aM'_{1-a})O_y$, M and M' independently comprises one or more metal ions that together have a combined average oxidation state between 3+ or 2+, $1>x\geq0.5$, $0.75\geq a>0$, $1\geq y\geq0.625$.

2. The lithium-ion cathode material as claimed in claim 1, wherein M and M' independently comprises one or more metal ions selected from Ni, Mn, Co, Al, Mg, Nb, Mo, or Zr.

3. The lithium-ion cathode material as claimed in claim 2, wherein neither M nor M' comprises metal ion of Co.

4. The lithium-ion cathode material as claimed in claim 2, wherein M and/or M' comprises metal ion of Co, and a molar ratio of metal ion of Co to M and V' is Co/(M+M')<0.1.

5. The lithium-ion cathode material as claimed in claim 4, wherein the molar ratio of metal ion of Co to M and M' is Co/(M+M')<0.05.

6. The lithium-ion cathode material as claimed in claim 1, wherein a molar ratio of metal ion Li to M and M' is Li/(M+M')>0.95.

7. The lithium-ion cathode material as claimed in claim 6, wherein the molar ratio of metal ion Li to M and M' is 1.2>Li/(M+M')>1.

8. The lithium-ion cathode material as claimed in claim 2, wherein M and/or M' comprises metal ion of Ni, and a molar ratio of metal ion of Ni to M and M' is Ni/(M+M')>0.5'.

9. The lithium-ion cathode material as claimed in claim 8, wherein the molar ratio of metal ion of Ni to M and M' is Ni/(M+M')>0.7.

10. A Lithium-ion electrochemical system, comprises a cathode electrode, wherein the cathode electrode comprises the lithium-ion cathode material as claimed in claim 1.

11. The lithium-ion cathode material as claimed in claim 2, wherein a molar ratio of metal ion Li to M and M' is Li/(M+M')>0.95.

12. The lithium-ion cathode material as claimed in claim 3, wherein a molar ratio of metal ion Li to M and M' is Li/(M+M")>0.95.

13. The lithium-ion cathode material as claimed in claim 4, wherein a molar ratio of metal ion Li to M and M' is Li/(M+M')>0.95.

14. The lithium-ion cathode material as claimed in claim 5, wherein a molar ratio of metal ion Li to M and M' is Li/(M+M')>0.95.

15. The lithium-ion cathode material as claimed in claim 3, wherein M and/or M' comprises metal ion of Ni, and a molar ratio of metal ion of Ni to M and M' is Ni/(M+M')>0.5.

16. The lithium-ion cathode material as claimed in claim 4, wherein M and/or M' comprises metal ion of Ni, and a molar ratio of metal ion of Ni to M and M' is Ni/(M+M')>0.5.

17. The lithium-ion cathode material as claimed in claim 5, wherein M and/or M' comprises metal ion of Ni, and a molar ratio of metal ion of Ni to M and M' is Ni/(M+M')>0.5.

* * * * *